Oct. 13, 1953  M. D. ETHERTON  2,655,232
METERING PIN FOR AIRCRAFT LANDING GEAR
Filed Oct. 14, 1950
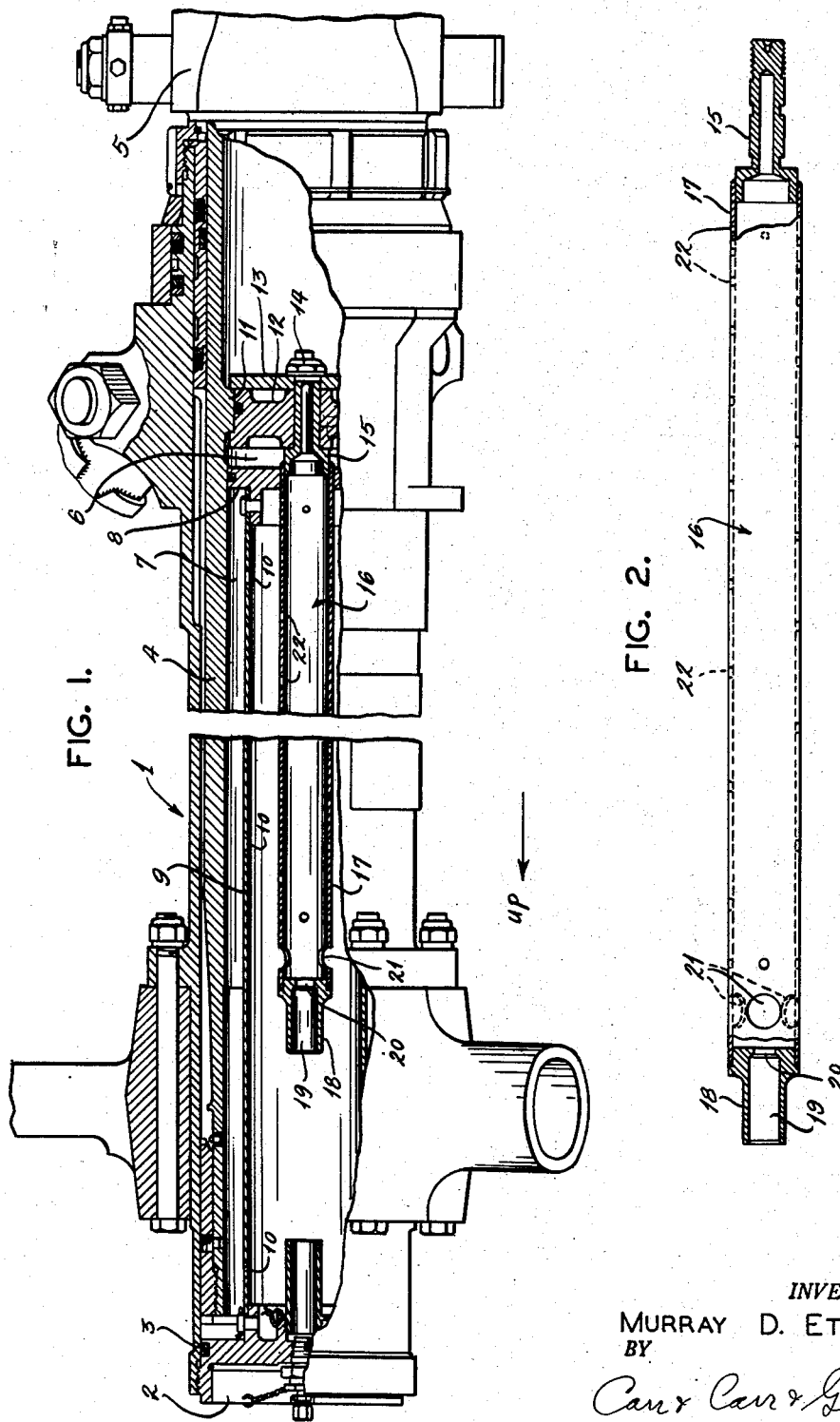
INVENTOR.
MURRAY D. ETHERTON
BY
*Carr & Carr & Gravely,*
ATTORNEYS.

Patented Oct. 13, 1953

2,655,232

UNITED STATES PATENT OFFICE 2,655,232

METERING PIN FOR AIRCRAFT LANDING GEAR

Murray D. Etherton, Kirkwood, Mo., assignor to McDonnell Aircraft Corporation, St. Louis, Mo., a corporation of Maryland Application October 14, 1950, Serial No. 190,165

1 Claim. (Cl. 188—88)

This invention is directed to hydraulic shock absorbing struts for aircraft and is more particularly directed to a device having graduated orifices therein for controlling the operation thereof.

The primary object of the invention is to provide controlling means for an aircraft shock absorbing strut in which the fluid flow from the pressure chamber to the non-pressure chamber is accomplished by a series of graduated orifices.

Another object of the invention is to provide a control for an aircraft shock absorbing strut that permits the parts thereof to telescope at varying rates of speed by causing fluid to flow through graduated orifices.

The invention consists in the provision of two telescoping members, to one of which is secured a metering pin disposed within one of the members, the pin extending through an aperture formed in a wall which divides the interior into two chambers and fitting closely in the aperture so that fluid will not pass between the pin and the aperture walls, the pin having a series of graduated orifices therein for controlling the flow of fluid from one chamber to the other, thus providing for a varying rate of telescopic movement of the members.

In the drawings:

Fig. 1 is an elevational view, partly in section, of a shock absorbing strut for aircraft; and Fig. 2 is an elevational view, partly in section, of the metering pin shown in Fig. 1.

The invention is incorporated in the structure shown in Fig. 1 in which the numeral 1 designates the external tubular member of an aircraft strut provided with brackets for securement to aircraft. A closure 2 is secured to one end of the tubular member and pressure sealing rings 3 are fitted into the closure. A tubular member 4 is fitted within the tubular member 1 and secured to the landing wheel supporting mechanism 5 which also constitutes a closure for one end of the tubular member 4. The space in the telescoped tubular members is divided into chambers 6 and 7 by means of a dividing wall 8, which wall is supported on a sleeve 9 secured to the closure 2. The sleeve has a series of apertures 10 therein so that fluid may flow into the space between sleeve 9 and the tubular member 4.

The tubular member 4 is provided with an internal collar 11 which supports a shoulder member 12, said member being clamped to the collar by means of a plate 13 and a nut 14 threaded to a metering pin support 15. The shoulder member and the metering pin support move with the tubular member 4 so that the metering pin 16 will move relative to the wall 8.

The metering pin is illustrated in greater detail in Fig. 2 and comprises a tubular member 17, to one end of which is secured the supporting member 15. The other end of the tubular member is provided with a closure 18 which has a bore 19 terminating in an orifice 20. Near the closure 18, the metering pin has a small number of relatively large apertures 21 therein and also a large number of axially spaced small bore apertures cut therein. As the metering pin moves relative to the dividing wall, the rate of fluid flow from chamber 6 into chamber 7 will be varied in accordance with the position of the several apertures.

The purpose of a metering pin in aircraft shock absorbing struts is to maintain a nearly constant load throughout its entire stroke, thus making it possible to absorb the landing energy with the least load on the aircraft structure and with a minimum weight of the landing gear and its supporting structure. The metering pin must restrict the flow of liquid to a small area during the first part of the stroke through orifice 20 so that the tire on the landing gear will be fully compressed while the strut telescopes only a small amount of the total distance of telescoping. As the tire reaches its full compression, the strut telescopes rapidly, whereupon the metering pin must provide a large area for liquid to flow through, this area being provided by the small number of large apertures 21. Through the balance of the telescoping stroke there is a decrease in the rate at which the strut telescopes and in the area through which oil flows. The decrease in area is accomplished by decrease in the number of small apertures 22 through which liquid flows.

The above described device is unique since it covers and uncovers apertures in the metering pin in such a way as to provide an opening which is, at first, small, such as orifice 20; then large, such as apertures 21; and gradually becoming small again through apertures 22 as tubular members 1 and 4 telescope. As the members telescope, the control of fluid flow shifts from the orifice 20 and apertures 21 to apertures 22 because the aperture area above wall 8 increases as the area below it decreases.

The metering pin provides a single orifice 20 at the upper end thereof, a small number of large apertures being located in the side of the pin a short distance from the closure. Below the large apertures, a large number of small apertures are arranged throughout the length of the metering pin. The total area of the small apertures is large in comparison with the area of orifice 20 at the top of the metering pin but small, as compared with the area of the large apertures 21 in the side of the metering pin. During the first portion of the telescopic stroke, liquid flows into the pin through all of the apertures in the side thereof and out through orifice 20 in the top or end thereof. The resistance to flow during this portion of the stroke is caused by orifice 20. When the closure of the metering pin has moved through wall 8 so that the small number of large apertures 21 has passed said wall, fluid will flow into the metering pin through the large number of small apertures and out of the pin through the large apertures, thus increasing the rate of liquid flow. The restriction to liquid flow is principally through the large number of small apertures. As the metering pin moves relative to wall 8, the number of small apertures through which liquid can flow into the metering pin is reduced, thus decreasing the rate at which the tubular members 1 and 4 telescope. Therefore the above structure provides the desired operating characteristics for aircraft landing gear without the use of valves.

The resistance to fluid flow is initially high and the resistance to flow is lowered quickly, then gradually increased as the tubular members telescope into each other. The device does not absorb reverse flow of energy as a primary function.

The above device has several advantages, the principal of which is its lighter weight by reason of tubular construction. Machining is held to a minimum and a high degree of accuracy is possible by simply drilling holes of the desired diameter in the pin. The pin can be rigidly supported against lateral movement since it has a uniform diameter and can be closely fitted in the wall 8 throughout its full extent of motion.

The left-hand end of the device illustrated in Fig. 1 is the upper end of the device, and when installed on an aircraft is so positioned that the arrow shown on the drawings indicates the upper end of the shock strut assembly.

What I claim is:

A shock absorbing strut for aircraft comprising a pair of telescoped members, a wall supported by one of said members for dividing the space in the strut into two chambers having an aperture therein, a metering pin supported by the other member and extending through said aperture in said chamber, an orifice in one end of said metering pin for establishing communication between said chambers for permitting said members to telescope slowly, a series of large apertures in said metering pin near one end thereof for establishing communication between said chambers for permitting said members to telescope rapidly; and other axially spaced apertures in said metering pin for establishing communication between said chambers for permitting said members to telescope at a decreasing rate.

MURRAY D. ETHERTON.

References Cited in the file of this patent

UNITED STATES PATENTS

| Number | Name | Date |
|---|---|---|
| 2,084,320 | Coleman | June 22, 1937 |
| 2,171,827 | Elliott | Sept. 5, 1939 |
| 2,243,280 | Kyle | May 27, 1941 |

FOREIGN PATENTS

| Number | Country | Date |
|---|---|---|
| 822,278 | France | May 27, 1937 |
| 375,205 | Great Britain | June 23, 1932 |